United States Patent
Carbone et al.

(10) Patent No.: US 11,227,738 B2
(45) Date of Patent: Jan. 18, 2022

(54) COOLING FOR A LAMP ASSEMBLY

(71) Applicant: HEWLETT-PACKARD DEVELOPMENT COMPANY, L.P., Houston, TX (US)

(72) Inventors: Kevin Carbone, Portland, OR (US); Alvin Marion Post, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 662 days.

(21) Appl. No.: 16/075,596

(22) PCT Filed: Apr. 21, 2017

(86) PCT No.: PCT/US2017/028764
§ 371 (c)(1),
(2) Date: Aug. 4, 2018

(87) PCT Pub. No.: WO2018/194640
PCT Pub. Date: Oct. 25, 2018

(65) Prior Publication Data
US 2021/0210302 A1 Jul. 8, 2021

(51) Int. Cl.
*H01J 7/26* (2006.01)
*B29C 64/295* (2017.01)
(Continued)

(52) U.S. Cl.
CPC .............. *H01J 7/26* (2013.01); *B29C 64/295* (2017.08); *F21V 29/503* (2015.01);
(Continued)

(58) Field of Classification Search
CPC ..................... H01J 7/24–28; H01J 61/52–526; H01K 1/58; B29C 64/264–291; F21V 29/503; F21V 29/505
See application file for complete search history.

(56) References Cited

U.S. PATENT DOCUMENTS 3,654,471 A * 4/1972 Nilsson .................... G02B 5/10
250/505.1
3,862,397 A * 1/1975 Anderson ............. C23C 16/481
219/405
(Continued)

FOREIGN PATENT DOCUMENTS

GB       2550343 A * 11/2017 ............. B33Y 30/00
JP     08102213 A * 4/1996
(Continued)

OTHER PUBLICATIONS

Technical Service FAQs, 2015, 26 pages < https://www.fusionuv.com/FAQs.aspx >.

*Primary Examiner* — Mariceli Santiago
(74) *Attorney, Agent, or Firm* — HP Inc. Patent Department

(57) ABSTRACT

An apparatus, system, and method for cooling a lamp assembly is described herein. The apparatus includes an air channel and an axial slot. A flow of air is injected into the air channel of a lamp housing, wherein the lamp housing comprises at least a bulb. The axial slot is located in a reflector housing and has dimensions that enable a constant flow of air through the slot and across the bulb when a predetermined air flow is input to the air channel.

15 Claims, 9 Drawing Sheets

(51) Int. Cl.
 H01K 1/58 (2006.01)
 B33Y 30/00 (2015.01)
 B33Y 40/00 (2020.01)
 F21V 29/503 (2015.01)
 F21V 29/505 (2015.01)

(52) U.S. Cl.
 CPC ............ *F21V 29/505* (2015.01); *H01K 1/58* (2013.01); *B33Y 30/00* (2014.12); *B33Y 40/00* (2014.12)

(56) References Cited

U.S. PATENT DOCUMENTS

| | | | |
|---|---|---|---|
| 4,434,562 A | 3/1984 | Bubley et al. | |
| 4,968,871 A * | 11/1990 | Hamrin | F21V 29/505 392/420 |
| 5,441,531 A | 8/1995 | Zarate et al. | |
| 6,227,686 B1 * | 5/2001 | Takahashi | G03B 21/16 362/345 |
| 6,696,801 B2 | 2/2004 | Schmitkons et al. | |
| 7,077,547 B2 | 7/2006 | Schmitkons et al. | |
| 7,775,690 B2 | 8/2010 | Wakalopulos | |
| 2005/0115498 A1 | 6/2005 | Ingram et al. | |
| 2010/0027265 A1 | 2/2010 | Nauen et al. | |
| 2011/0002058 A1 | 1/2011 | Leonhardt | |
| 2013/0083539 A1 * | 4/2013 | Dimitriadis | F21V 29/83 362/297 |
| 2017/0043518 A1 | 2/2017 | Narayanaswamy | |

FOREIGN PATENT DOCUMENTS

| | | | |
|---|---|---|---|
| JP | 09080959 A * | 3/1997 | |
| RU | 506825 A1 | 3/1976 | |

* cited by examiner

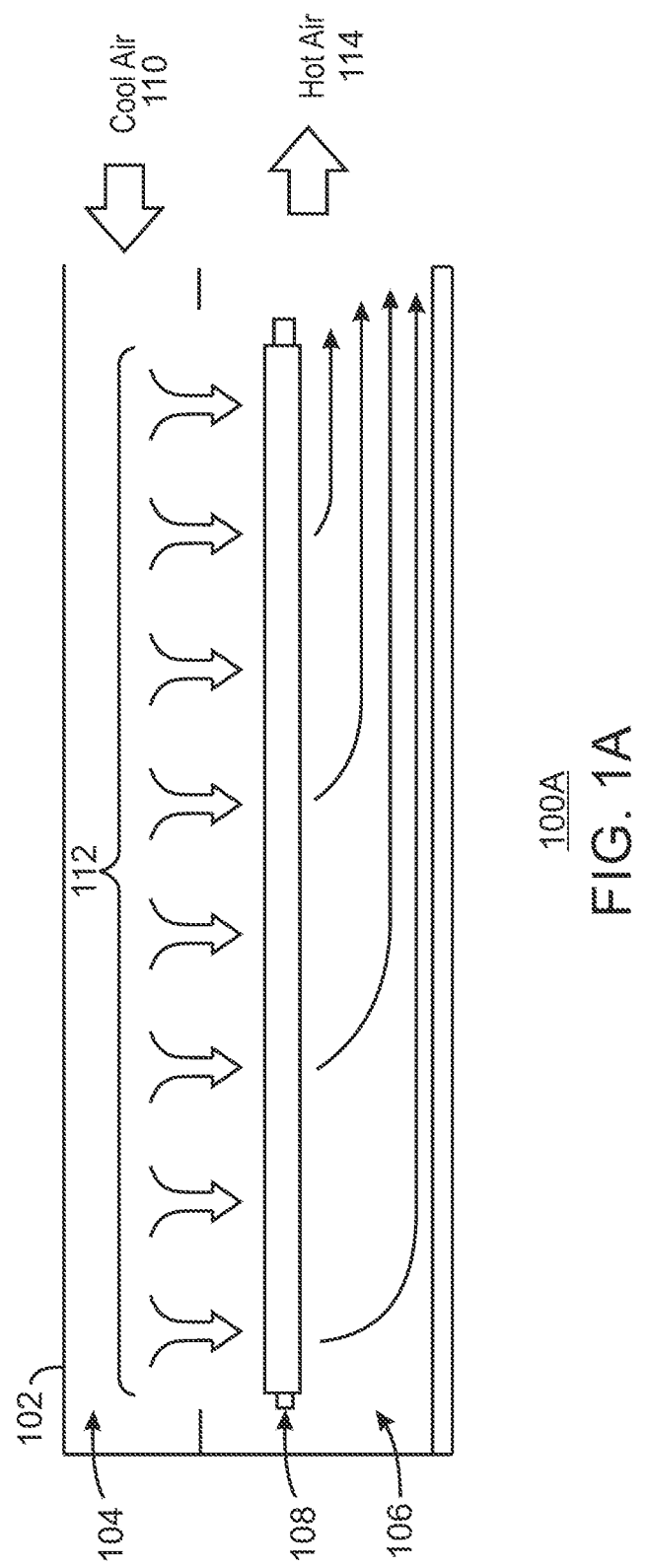

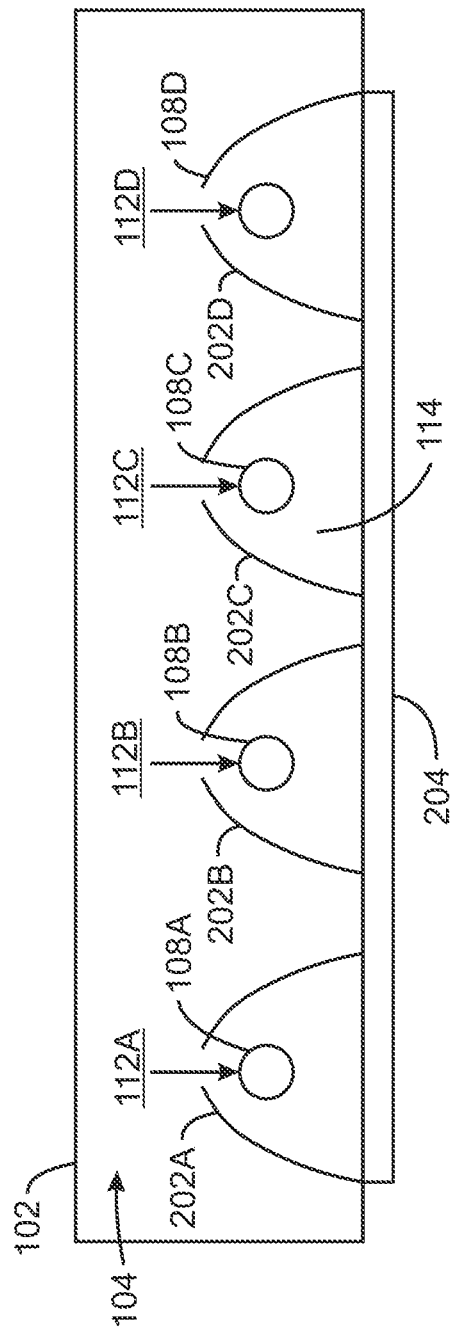

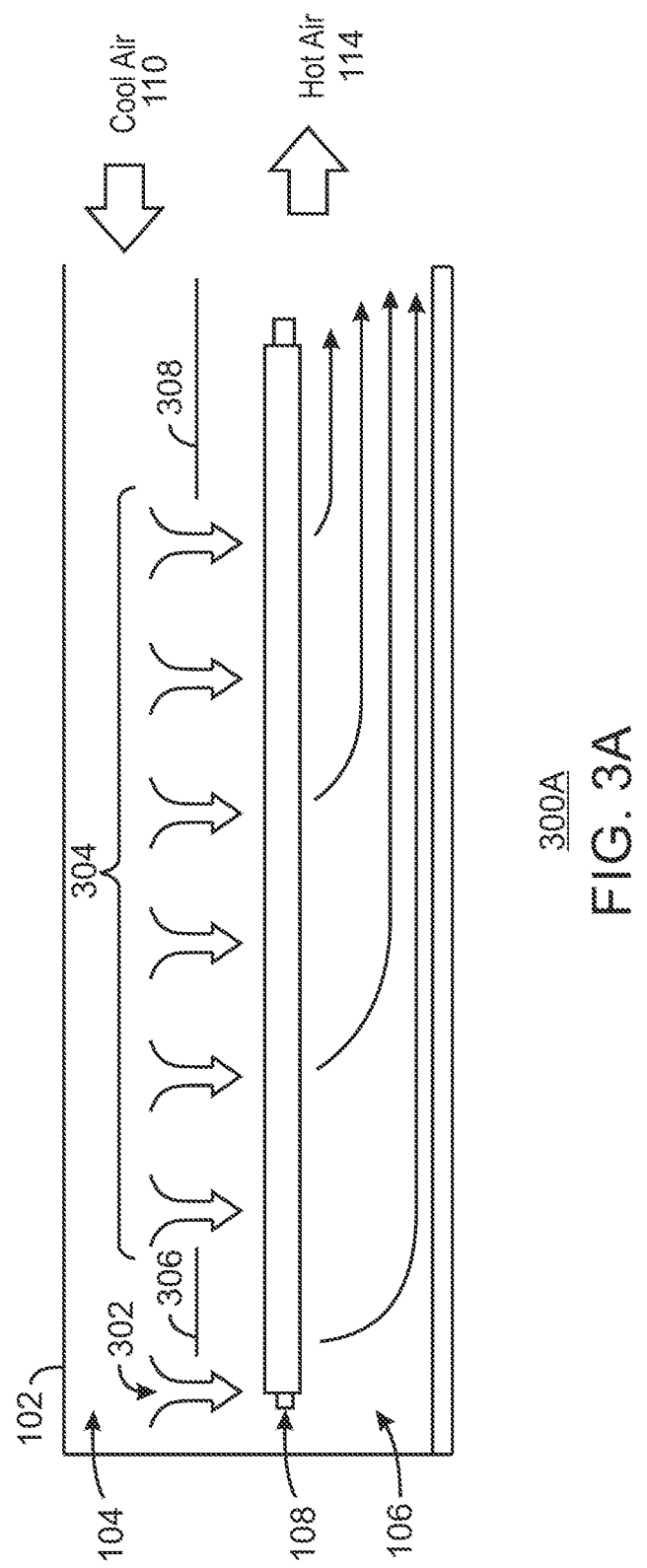

300B

COOLING FOR A LAMP ASSEMBLY

BACKGROUND

Three-dimensional (3D) printing may be used to produce a 3D object. During 3D printing, a lamp assembly may be used to enable the fusing of successive layers of material under computer control to produce a 3D object. The temperature and output of the lamp assembly can affect the quality of the final printed 3D object.

DESCRIPTION OF THE DRAWINGS

Certain examples are described in the following detailed description and in reference to the drawings, in which:

FIG. 1A is an illustration of a cooling system 100A for a uniform lamp assembly temperature and output according to one example;

FIG. 2A is a cross section illustration of a cooling system 200A for a uniform lamp assembly and temperature output according to one example;

FIG. 3A is an illustration of a cooling system 300A for a uniform lamp assembly temperature and output with the airflow selectively restricted at a distal end of the axial slot according to one example;

DETAILED DESCRIPTION

Figure 1B:
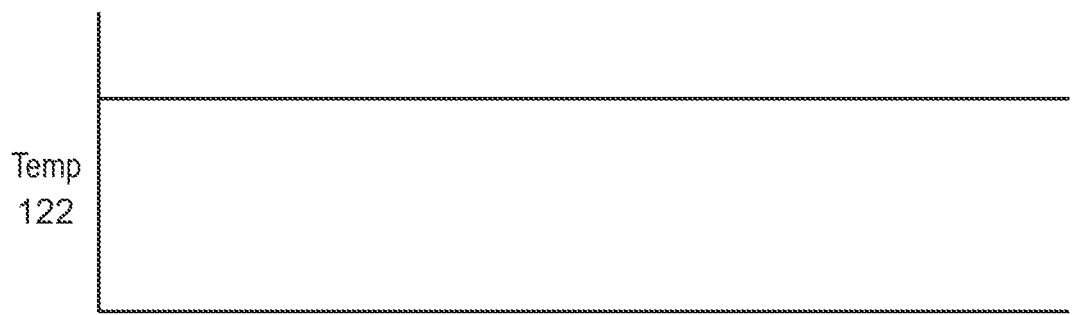
FIG. 1B is a line graph illustrating a temperature profile 100B of the lamp assembly according to one example.

Techniques for the cooling of a lamp assembly are described herein. The cooling described results in a uniform lamp assembly temperature output. A lamp assembly includes a plurality of chambers or channels, a lamp tube or bulb, and a reflector. The lamp assembly may be a component of a three dimensional (3D) printer. In examples, 3D printing is realized by building and modifying materials with "layer-by-layer" control as the bulk product may include an amalgamation of individual layers that have been "stitched" together at a molecular level via the introduction of thermal, radiative, and/or ionized beam energy. The thermal and radiative energy may be provided by the lamp assembly. The 3D printer may include an inkjet-type print head pen with a plurality of nozzles that selectively apply printing agents to the various layers of material. The lamp assembly enables fusion of the layers by melting the material. The present techniques are used to dissipate the heat or thermal energy associated with a number of watts output by the lamp assembly with a fixed amount of incoming air.

The lamp assembly may experience an increase in temperature as light from the lamp is used to combine successive layers of material applied to a work surface. As discussed below, the lamp assembly may include a lamp housing, an air channel, and an axial slot to receive an airflow from the air channel. The air is directed across the lamp tube or bulb in order to maintain a uniform temperature and output of the lamp assembly. In the field of 3D printing, physical objects are printed via a lamp tube or bulb and various layers of material that are fused together via the heat generated from the bulb. In particular, several high energy quartz-tungsten-halogen (QTH) lamps, each using more than 1000 Watts (W), may be used to fuse materials in 3D printers. Around half the total energy directed toward the material can be lost inside the lamp assembly. Moreover, internal heat loads are increased substantially beyond that by radiant energy reflected back in, from the bed surface of the 3D printer. Thus, the lamp assemblies implement substantial forced air cooling, as uncooled units may readily melt aluminum frames and reflectors used in 3D printing. However, the need for cooling goes beyond avoiding a meltdown.

In particular, QTH bulbs are long and thin. For example, the bulb may be about 25 centimeters (cm) long and about 8-10 millimeters (mm) in diameter. A wall of the QTH bulb may be maintained between 300 and 700 C to assure a properly functioning internal 'halogen cycle', that can promote good bulb life and stable radiant output. Furthermore, a uniform radiant output and temperature along the length of the lamps and their housing is used to ensure part quality across the bed width. A temperature gradient in the bed, front-to-rear, of only a few degrees can cause parts on one side or the other to lose strength and dimensional accuracy, and can cause caking. Such a gradient may arise for two reasons. First, if the lamp radiant output differs front to rear, or second, if the lamp housing temperature varies front to rear. Such differences affects the bed or work surface temperature via long wavelength IR, per the laws of radiative heat transfer. Differences in bed temperature via long wavelength IR may also occur independently due to non-uniform cooling of the housing. The bed temperature variation front-to-rear significantly damages part quality due to variation in lamp and housing radiation.

The 3D printer may also include a plurality of nozzles to apply ink to materials deposited on the work surface. The lamp assembly is cooled in a uniform manner to enable acceptable printer performance. For example, a wall of a QTH bulb within the lamp assembly should be maintained between 300 and 700 degrees Celsius to ensure a properly functioning internal halogen cycle as required for good bulb life and a stable radiant output. Moreover, a uniform temperature across the length of the bulb reduces caking of materials during printing while maintaining strength and dimensional accuracy. To maintain a uniform temperature and output, an input airflow may be directed into an air channel that is adjacent to at least one axial slot. The axial slot may be sized such that the airflow is input into the lamp chambers as a cross airflow. The length of the axial slot may be based at least on characteristics of the airflow, such as the pressure of the airflow. Optionally, the airflow may be selectively restricted at a distal end of the axial slot, where the distal end is a portion of the axial slot that is the furthest away from the input airflow. By selectively restricting the airflow, the temperature profile of the lamp assembly may be modified. The flow of air may be guided away from the lamp tube, thus removing hot air from near the bulb.

The air slot is designed to enable a uniform airflow in areas where airflow is desired. The size of the slot may be based on an incoming airflow rate versus the length and width of the lamp assembly housing. Moreover, the selective restrictors may be implemented as baffles near each end of the lamp tube. The baffles of the slot may be tapered or thickened to maintain a uniform airflow across the lamp tube. Accordingly, the axial slot may be tuned, along with any baffles, to obtain a desired temperature profile from the lamp assembly. Moreover, the size of the axial slot may also be used to minimize the size and speed of the air mover that is used to provide adequate cooling.

The air pressure within the lamp assembly may be higher in the cool air channel and lower in the exhaust air channel. Air cooling along the major axis of the lamps is desirable, but without modification forced air cooling along the direction of the major lamp axis prevents efficient cooling and creates a temperature gradient as the air is heated along the axis of the lamp tube. The major axis refers to the axis that runs parallel to the length of the lamp tube. By injecting small amounts of air at specific locations along the lamp axis, the gradient can be eliminated by tailoring at least one air slot to provide a particular temperature profile. The present techniques enable elimination the temperature gradient and with optimization of performance by injecting air at specific locations along the lamp axis in a predominantly axial cooled design.

The present techniques can also be used to minimize air flow and pressure requirements. In operation, the lamp assembly travels perpendicular to the lamp tube major axis, and flexible air hoses or a sliding port are used to provide and remove air. This is most efficiently done at one end of the lamp housing, typically in the "back," away from the operator access area. Note that the air mover can be placed on the inlet or outlet side of the system, providing either positive pressure or suction, without consequence. While periodic jets of air may be used to provide cooling to a lamp assembly, such cooling results in a large temperature gradient across the lamp assembly (and possibly a gradient in radiant lamp output) that the resulting part quality is non-uniform across the bed width.

FIG. 1A is an illustration of a cooling system 100A for a uniform lamp assembly temperature and output. The cooling system 100A may be referred to as a hybrid axial/crossflow solution, and has a long slot with a continuous air bleed across the length of the lamp. The lamp housing 102 includes a plurality of lamp chambers, such as lamp chamber 104 and lamp chamber 106 and a lamp tube/bulb 108. While one lamp tube is illustrated, a plurality of lamp tubes may be included. Moreover, the lamp major axis runs from left to right in FIG. 1A along the length of the tube 108. In FIG. 1A, cool air 110 is input to the air channel 104 where it is forced through a longitudinal slot 112 running the length of the chamber into the into the lamp chambers 106. The axial slot may be formed in a reflector housing surrounding the bulb 108 in the lamp assembly 100A. As illustrated, the slot 112 has a number of arrows indicating the movement of air through the slot 112 and across the bulb 108. Each arrow is of the same size, indicating a uniform flow of air through the slot 112. In other words, the air through the slot is at a constant pressure along the entire length of the slot. A slot may have a larger cross sectional area than periodic ports or jets used to accomplish the same cooling, greatly reducing the pressure gradient needed to drive airflow, thus minimizing blower requirements. Hot air 114 is exhausted at one end of the lamp chamber 106. Additionally, the slot may be uniform width or it might be tapered.

Other lamp assemblies simply use a number of holes between the lamp chambers to cool the bulb. Such an implementation prevents a pressure imbalance between the lamp chambers. However, airflow is severely limited due to the multiple holes and the friction created between chambers. Before the air goes through the holes, that area behind the holes is kept at a relatively high uniform pressure so to obtain a uniform pressure in the second chamber. Much higher is a relative term. In examples, the pressure is much higher when compare to the area to be cooled. The present techniques enable a larger hole, and thus a greater amount of air flow is allowed within the lamp assembly. Put another way, where there is a large hole, there is a high amount of airflow. Accordingly, the present techniques can be used to accomplish the same amount of cooling using lower air pressures and speeds within the lamp assembly. The present techniques may be used to control a control cubic feet per minute or pounds mass per minute of air through the lamp assembly. Air pressure data may be used to control the volume of air through the lamp assembly via a thermal manager.

FIG. 1B is a line graph illustrating a temperature profile 100B of the lamp assembly. The temperature profile 100B illustrates the temperature 122 along the length 120 of the bulb 108 (FIG. 1A). As illustrated, the temperature profile 100B is substantially flat along the length of the lamp assembly. A length and a width of the axial slot may be sized such that a substantially flat temperature profile is maintained. As used herein, a substantially flat temperature profile is one that does not vary by more than a predetermined number of degrees, such as one degree, two degrees, five degrees, ten degrees, and so on. The predetermined number of degrees may be based on the thermal output of the lamp assembly or bulb, as well as the volume surrounding the bulb.

FIG. 2A is a cross section illustration of a cooling system 200A for a uniform lamp assembly and temperature output. The cooling system 200A includes a lamp assembly housing 102, a plurality of reflectors 202A, 202B, 202C, and 202D. Within each reflector is a tube/bulb 108A, 108B, 108C, and 108D. The reflectors may be positioned within the lamp assembly to direct thermal energy from the lamp onto the glass 204. The axial slot 112A, 112B, 112C, and 112D is positioned at the top of each reflector plurality of reflectors 202A, 202B, 202C, and 202D. The axial slots 112 may be positioned such that the least amount of luminance is lost due to the lack of reflective material that occurs at the location of the slot. Thus, the axial slot may be above the tube 108 with respect to the glass 204. The axial slot may also be placed in a location that does not distort light as it lands on the glass 204.

Figure 2B:
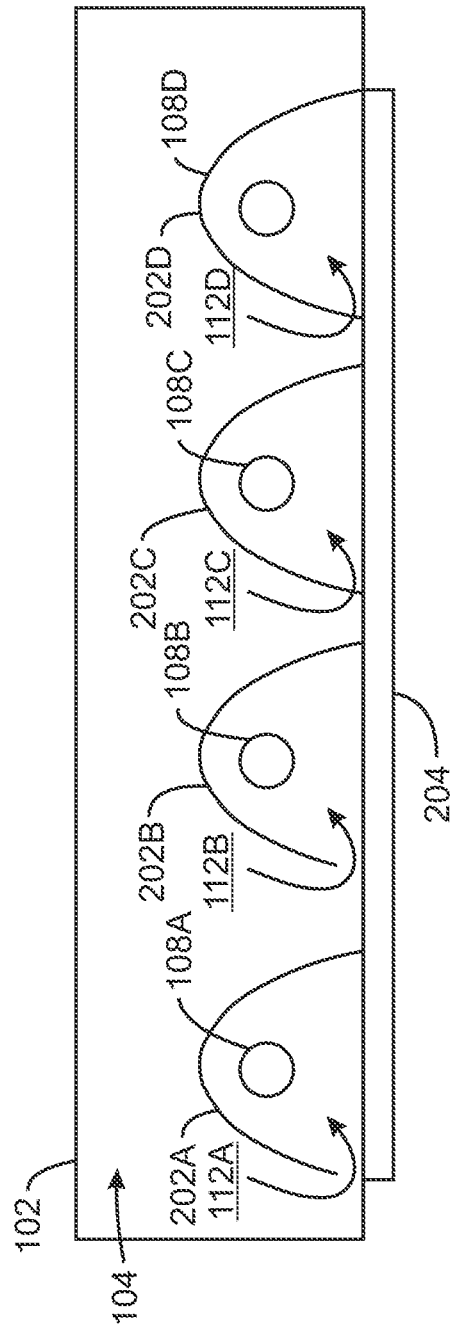
FIG. 2B is a cross section illustration of a cooling system 200B for a uniform lamp assembly and temperature output according to one example.

FIG. 2B is a cross section illustration of a cooling system 200B for a uniform lamp assembly and temperature output. The cooling system 200B includes a lamp assembly housing 102 that is to receive inlet air at a relatively higher air pressure and a plurality of reflectors 202A, 202B, 202C, and 202D. Within each reflector is a bulb 108A, 108B, 108C, and 108D. The axial slot 112A, 112B, 112C, and 112D is positioned at a bottom edge of each reflector plurality of reflectors 202A, 202B, 202C, and 202D.

As illustrated in FIG. 2B, the axial slot occurs at a bottom left corner of the reflector. During manufacture of the lamp assembly, defects such as leaks often occur at a bottom portion of the reflector, where the reflector joins the lamp housing 102. Such defects often do not affect the performance of the lamp assembly. As a result, slots at the bottom portion of the reflector do not greatly affect the desired light output. Similarly, with the slot positioned as described in FIG. 2A, light that is reflected immediately above the work surface is not reflected back down to the work surface. Thus, the slot positioned directly above the bulb does not affect the performance of the reflector when compared to a reflector without a slot.

While two slot positions are described, the slot may be placed along the length of the reflector at any position. Some positions of the slot may create asymmetry to the lamp assembly design. Asymmetry in the lamp design refers to a non-symmetrical casting of light onto the work surface. The asymmetry may be mitigated by various printing schemes to ensure a uniform light and radiant energy application across the entire work surface of the glass 204.

The longitudinal axial slot may be combined with a baffle at a distal end of the lamp assembly. As used herein, the distal end of the lamp assembly is the end farthest away from the air flow input. The baffle may be created by joining the reflector material from one side of the slot to the other side of the slot, thereby creating a secondary, smaller slot. The secondary, smaller slot may occur at any point along the length of the reflector. The axial slot and the secondary slot may be at different positions along the length of the reflector. The baffle may prevent the flow of air at the point where the baffle occurs.

FIG. 3A is an illustration of a cooling system 300A for a uniform lamp assembly temperature and output with the airflow 302 selectively restricted at a distal end of the axial slot 304. The cooling system 300A may be referred to as a hybrid axial/crossflow solution. In this design, the ends of the lamp assembly can be made purposefully warmer, while reducing temperature in the middle (or vice versa). Via a size of the axial slot, a center portion of the bulb 108 can be maintained at a uniform temperature excluding elevated temperature regions at each end of the bulb 108. For example, the temperature may be elevated at 1 inch of each end of the lamp tube 108.

An elevated temperature at each end of the lamp housing may be desirable because the edges of the bed are naturally cooler than the center. Further, parts are not printed within 1" of the edges. The temperature of the center portion of the lamp tube may be lower than the temperature that occurs with a flat temperature response (FIGS. 1A and 1B). Thus, less heat is radiated to a printing assembly pen that is adjacent to the lamp housing. Often, the pen is restricted to printing above the bulb, as printers often observe a margin and do not print outside the margin. Thus, in FIG. 3A, the pen would not be used to print in areas with an elevated temperature, such as near the ends of the tube 108. In such a design, the pen is often near areas of the lamp assembly that are the coolest. Pen temperature may be a sensitive measurement and even a few degrees of cooling makes a difference in performance. Note in FIG. 3A that at the far left end, the air flow cannot be zero or that portion of the lamp could overheat. With an appropriate amount of air admitted at this distal end, a desired temperature profile can be attained.

During printing, the lamp assembly may move back and forth, left to right, over a bucketful of build material. Printing agents or ink is placed on the powder, and wherever the ink is placed, light is absorbed and then the powder will melt. In the places where there is no ink present, white powder remains and reflects the light. Because the light is reflected, the powder will not melt. Thus, during printing ink is placed atop of a power in a pattern. The pattern is fused or melted in part from the light output by the lamp assembly.

To apply the ink to the powder, the print head or pen is used. The pen can heat up quickly. In particular, the inside of the pen is often maintained at a low temperature, such as below 50 degrees Celsius to prevent negative reactions with ink within the pen. For example, high temperatures may cause the ink to dry out quickly. However, the pen is often located near the lamp assembly. By keeping an area of the lamp assembly where the pen will be located as cool as possible, integrity of the ink is preserved.

Figure 3B:
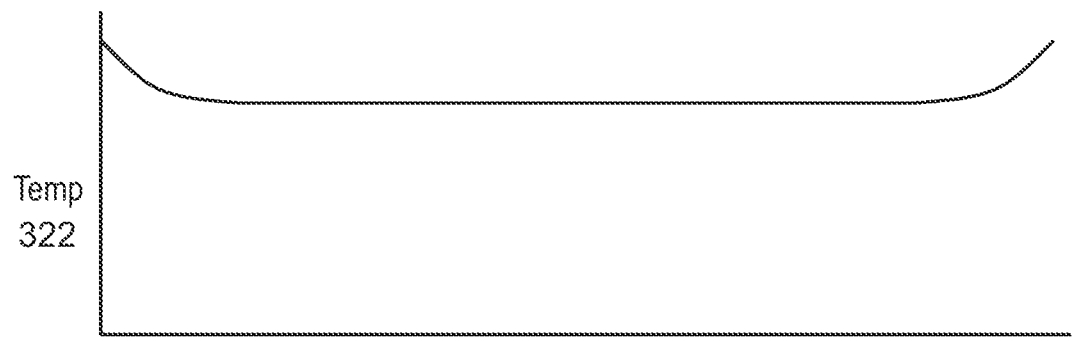
FIG. 3B is an illustration of a temperature profile 300B. As illustrated, the temperature profile 300B is substantially flat at the center along the length of the lamp assembly according to one example.

FIG. 3B is an illustration of a temperature profile 300B. As illustrated, the temperature profile 300B is substantially flat at the center along the length of the lamp assembly. However, at each end of the lamp tube, the temperature increases slightly, relative to the power output of the bulb. A length and a width of the axial slot may be sized such that a substantially flat temperature profile is maintained with a rise in temperature at each edge of the bulb.

In embodiments, a uniform slot along the length of the lamp assembly results in a totally flat temperature profile assuming, that the slot is designed such that there is a uniform air flow through the slot. However, if the slot is, for example, too big at the inlet side a lot of air pressure may be lost at the near end of the slot with no air reaching the distal end of the slot. Thus, the relationship between the slot length, width and position must be used to determine the needed output of air, based on the heat generated by the bulbs of the lamp assembly. The addition of the baffle 306 lets less circulate near the distal end of the bulb. Because of this lack of air, the temperature at that end of the bulb might rise slightly. The near side of the temperature profile may also increase slightly due to a larger baffle 308 at the near side.

The outlet air or the right end of the temperature graphs 100B (FIG. 1B) and 300B (FIG. 3B) is the same. The number of watts dumped into the air determines the outlet temperature of the air. For example, consider an outlet temperature of 100 degrees outlet temperature. The inlet temperature might be, for example, 30 degrees. According to the present techniques, most of the lamp is going to be a little under 100 degrees; such as 95 degrees at the center portion while the two ends are at 100 degrees. Thus, there is a temperature differential at each end of the lamp assembly. Accordingly, the present techniques may be used to control the temperature profile along the length of that lamp assembly and push up the temperature at each end. The temperature may also be depressed at each end.

Figure 4:
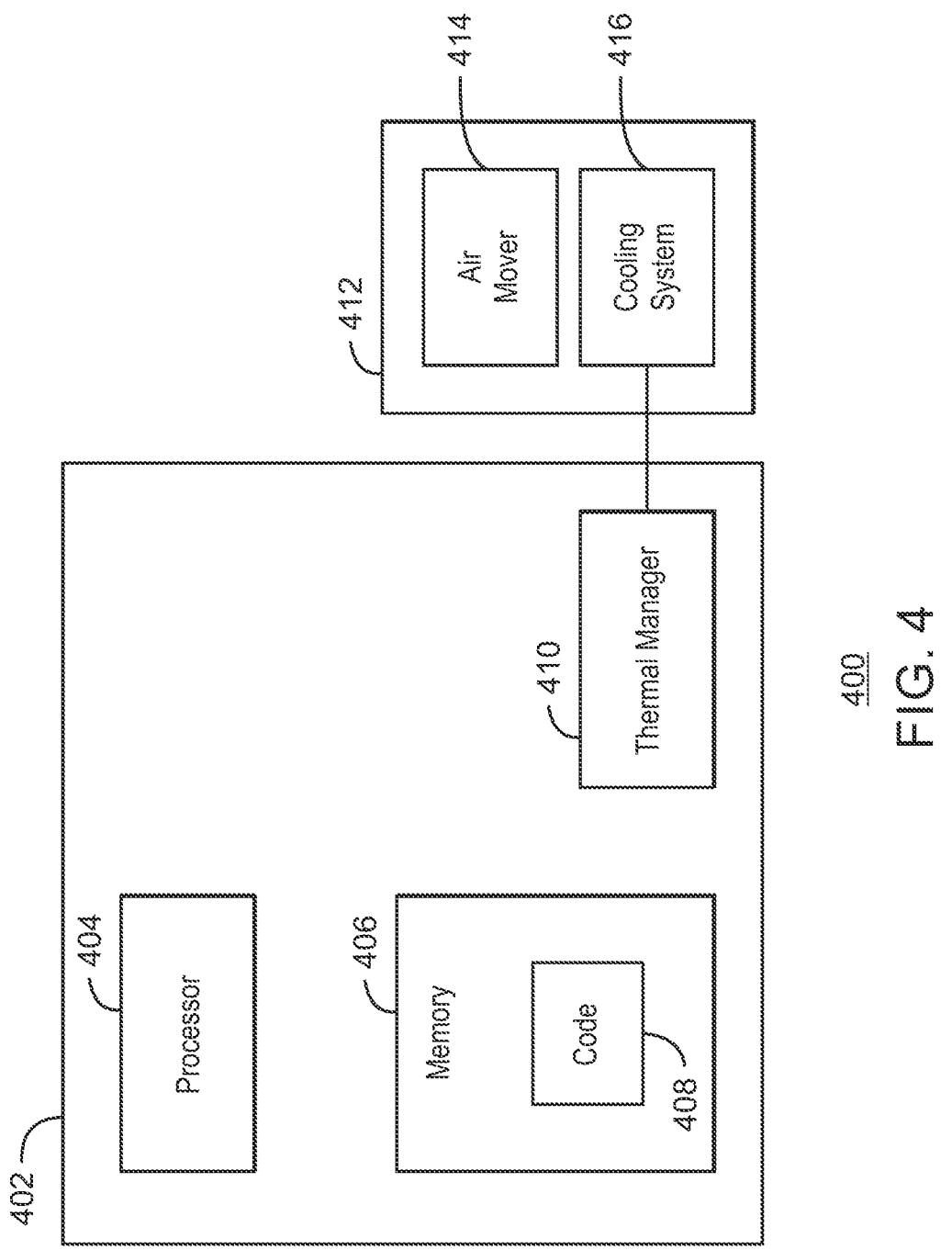
FIG. 4 is a block diagram of a system 400 to dispose of a printed three-dimensional (3D) object which may be defective according to one example.

FIG. 4 is a block diagram of a system 400 to dispose of a printed three-dimensional (3D) object which may be defective. The system 400 processor may include a computing device 402, a processor 404, a memory 406 with code 408, and a thermal manager 410. The thermal manager 410 may be coupled with a lamp assembly 412. The lamp assembly 412 may include an air mover 414 and a cooling system 416. The cooling system 416 may be a cooling system 100A, 200A, 200B, or 300a as described above.

The computing device 402 may include memory 406 that stores instructions executable by a processor 404. The processor 404 may be more than one processor, and each processor may have more than one core. The processor 404 may be a single core processor, a multi-core processor, a computing cluster, or other configurations. The processor 404 may be a central processing unit (CPU), a microprocessor, a processor emulated on programmable hardware (e.g. FPGA), or other type of hardware processor. The processor 404 may be implemented as a Complex Instruction Set Computer (CISC) processor, a Reduced Instruction Set Computer (RISC) processor, an x86 Instruction set compatible processor, or other microprocessor or processor.

The memory 406 may be non-volatile memory and/or volatile memory. The non-volatile memory may include hard drive(s), solid state drive(s), read-only memory (ROM) (e.g., Mask ROM, PROM, EPROM, EEPROM, etc.), flash memory, and so forth. The volatile memory may include cache, random access memory (RAM) (e.g., SRAM, DRAM, zero capacitor RAM, SONOS, eDRAM, EDO RAM, DDR RAM, RRAM, PRAM, etc.), and other volatile memory. Other memory systems may be employed. The memory 406 can be used to store data and code 408, such as instructions, logic, etc. that, when executed by the processor 404, direct the processor 404 to perform various operations in accordance with examples described herein.

Computing device 402 may also include a thermal manager 410. The thermal manager may monitor temperatures of the lamp assembly and adjust a speed of an air mover 414 as needed. The air mover may be a fan, blower, electrokinetic system, and the like. The air mover 414 may operate in conjunction with the cooling system 416 as described above.

The block diagram of FIG. 4 is not intended to indicate that the system 400 is to include all of the components shown in FIG. 4. Rather, the system 400 can include fewer or additional components not shown in FIG. 4, depending on the details of the specific implementation. The system 400 may include both local and remote implementations. Furthermore, any of the functionalities of the processor 404 may be partially, or entirely, implemented in hardware and/or a processor. For example, the functionality may be implemented in any combination of Application Specific Integrated Circuits (ASICs), Field Programmable Gate Arrays (FPGAs), logic circuits, and the like. In addition, examples of the present techniques can generally be implemented in electronic devices, including ultra-compact form factor devices, such as System-On-a-Chip (SOC), multi-chip modules, and other electronic devices.

Figure 5:
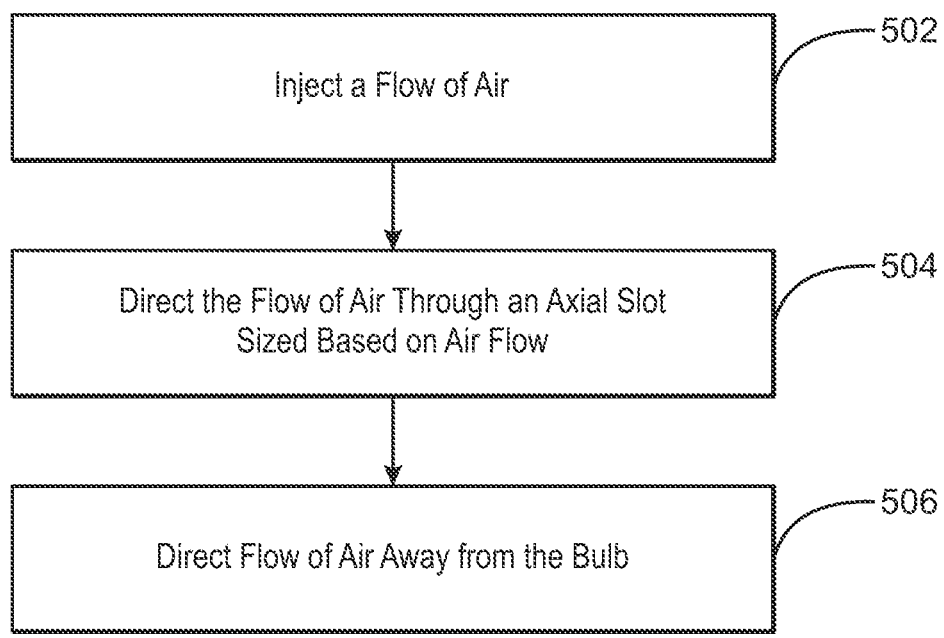
FIG. 5 is a block flow diagram of a method 500 for cooling for a uniform lamp assembly temperature and output according to one example.

FIG. 5 is a block flow diagram of a method 500 for cooling for a uniform lamp assembly temperature and output. The method 500 may be performed by the cooling system 100 shown in FIGS. 1A, 2A, 2B, and 3A. The method 500 may start at block 502 when a flow of air is injected into an air channel of a lamp housing, wherein the lamp housing comprises at least a bulb. At block 504, the flow of air is directed from the air channel through a single axial slot that is sized, based on the air flow, to enable a constant flow of air through the slot and across the bulb. Finally, at block 506 the flow of air is guided away from the bulb.

Figure 6:
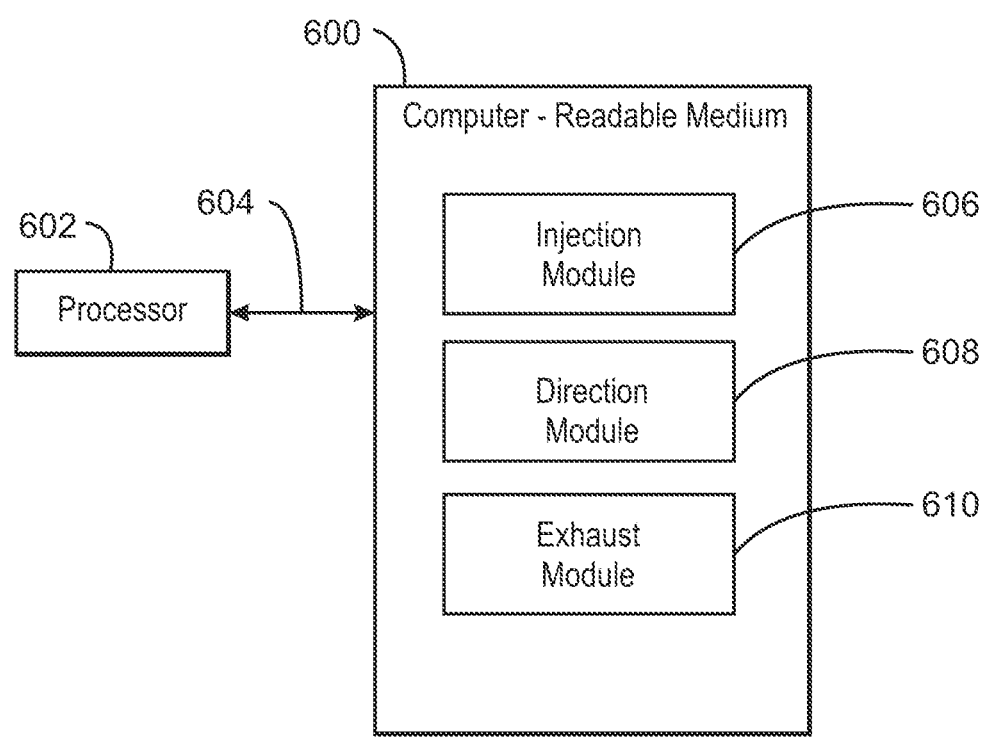
FIG. 6 is a block diagram of a medium 600 containing code to execute cooling for a uniform lamp assembly temperature and output in accordance with examples of the present techniques.

FIG. 6 is a block diagram of a medium 600 containing code to execute cooling for a uniform lamp assembly temperature and output. The medium 600 may be a non-transitory computer-readable medium that stores code that can be accessed by a processor 602 via a bus 604. For example, the computer-readable medium 600 can be a volatile or non-volatile data storage device. The medium 600 can also be a logic unit, such as an ASIC, an FPGA, or an arrangement of logic gates implemented in one or more integrated circuits, for example.

The medium 600 may include modules 606-610 configured to perform the techniques described herein. For example, an injection module 606 may be configured to inject a flow of air into an air channel of a lamp housing, wherein the lamp housing comprises at least a bulb. The direction module 608 may be configured to direct the flow of air from the air channel through a single axial slot that is sized, based on the air flow, to enable a constant flow of air through the slot and across the bulb. Finally, an exhaust module 610 may be configured to guide the flow of air away from the bulb.

The block diagram of FIG. 6 is not intended to indicate that the medium 600 is to include all of the components shown in FIG. 6. Further, the medium 600 may include any number of additional components not shown in FIG. 6, depending on the details of the specific implementation.

In summary, an example may include an apparatus for cooling a lamp assembly. The apparatus may include an air channel and an axial slot. A flow of air is injected into the air channel of a lamp housing, wherein the lamp housing comprises at least a bulb. The axial slot is located in a reflector housing and has dimensions that enable a constant flow of air through the slot and across the bulb when a predetermined air flow is input to the air channel.

The axial slot may be located at the top of a reflector housing. Alternatively, the axial slot may be located at the bottom of a reflector housing. A selective restrictor may be placed at a distal end of the axial slot, wherein the selective restrictor restricts the flow of air to achieve a particular temperature response. The selective restrictor may be a baffle. Optionally, the bulb may be a quartz-tungsten-halogen (QTH) bulb. Further, the axial slot may be sized to maintain a uniform temperature across the bulb.

Another example is a method for cooling a lamp assembly. The method may include injecting a flow of air into an air channel of a lamp housing, wherein the lamp housing comprises at least a bulb and directing the flow of air from the air channel through a single axial slot that has dimensions to enable a constant flow of air through the slot and across the bulb when a predetermined air flow is input to the air channel. The method may also include guiding the flow of air away from the bulb.

The at least one axial slot may be sized to reduce a pressure gradient used to drive the flow of air. The at least one axial slot may also be sized to generate a flat temperature response. The air flow at the distal end of the axial slot may be selectively restricted to enable a temperature response that is slightly warmer at each end of the lamp tube. The axial slot may occur at a top of a reflector that surrounds the lamp tube. The axial slot may also occur at a lower edge of a reflector that surrounds the lamp tube. Further, the axial slot may occur along a reflector at a location that minimally affects illumination.

An additional example is a system for cooling a lamp assembly. The system includes a lamp tube that generates heat and a reflector to direct light produced by the lamp tube, wherein the reflector includes a least one axial slot. Additionally, the system includes an air channel that directs an air flow across the lamp tube via the axial slot, wherein the axial slot is located in a reflector housing and has dimensions that enable a constant flow of air through the slot and across the bulb when a predetermined air flow is input to the air channel. A second air channel is to guide hot air away from the lamp tube. In the system, the axial slot may have dimensions to generate a temperature response from the lamp tube with elevated temperatures at each end of the lamp tube.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. An apparatus for cooling a lamp assembly, comprising:
   an air channel, wherein a flow of air is injected into the air channel of a lamp housing having an open end and a closed end opposite the open end, wherein the lamp housing comprises at least a bulb; and
   an axial slot, wherein the axial slot is sized based on the air flow to enable a constant flow of air through the axial slot and across the bulb; and
   wherein air is input into the air channel through the open end of the lamp housing and forced through the axial slot, across the bulb, and back out through the open end of the housing.

2. The apparatus of claim 1, wherein the axial slot is located at the top of a reflector housing.

3. The apparatus of claim 1, wherein the axial slot is located at the bottom of a reflector housing.

4. The apparatus of claim 1, comprising a selective restrictor as a distal end of the axial slot, wherein the selective restrictor restricts the flow of air to achieve a particular temperature response.

5. The apparatus of claim 1, wherein the bulb is a quartz-tungsten-halogen (QTH) bulb.

6. The apparatus of claim 1, wherein the axial slot is sized to maintain a uniform temperature across the bulb.

7. A method for cooling a lamp assembly, comprising:
   injecting a flow of air into an air channel through an open end of a lamp housing, wherein the lamp housing comprises at least a bulb;
   directing the flow of air against a closed end of the lamp housing opposite the open end, through an axial slot, across the bulb, and back out through the open end of the lamp housing, the axial slot sized, based on the air flow, to enable a constant flow of air through the slot and across the bulb; and
   guiding the flow of air away from the bulb.

8. The method of claim 7, wherein the at least one axial slot is sized to reduce a pressure gradient used to drive the flow of air.

9. The method of claim 7, wherein the at least one axial slot is sized to generate a flat temperature response.

10. The method of claim 7, wherein the air flow at the distal end of the axial slot is selectively restricted to enable a temperature response that is slightly warmer at each end of the lamp tube.

11. The method of claim 7, wherein the axial slot occurs at a top of a reflector that surrounds the lamp tube.

12. The method of claim 7, wherein the axial slot occurs at a lower edge of a reflector that surrounds the lamp tube.

13. The method of claim 7, wherein the axial slot occurs along a reflector at a location that minimally affects illumination.

14. A system for cooling a lamp assembly, comprising:
   a lamp tube that generates heat;
   a reflector to direct light produced by the lamp tube, wherein the reflector includes a least one axial slot;
   an air channel that directs an air flow from an open end of the assembly, against a closed end of the assembly opposite the open end, across the lamp tube via the axial slot, and back out through the open end of the assembly, wherein the size of the axial slot is based on the air flow; and
   a second air channel to guide hot air away from the lamp tube.

15. The system of claim 14, wherein the axial slot is sized to generate a flat temperature response from the lamp tube.

* * * * *